United States Patent Office 3,223,542
Patented Dec. 14, 1965

3,223,542
WATERPROOFING PREPARATION
Neville A. Hammer, Sr., 617 W. Woodrow Ave.,
Knoxville, Tenn.
No Drawing. Filed Apr. 6, 1965, Ser. No. 446,121
The portion of the term of the patent subsequent to
June 30, 1981, has been disclaimed
8 Claims. (Cl. 106—89)

This application is a continuation-in-part of my copending application Serial No. 364,803 filed June 30, 1964, and now abandoned, which in turn was a continuation-in-part of my application Serial No. 220,037, filed August 28, 1962, and now Patent No. 3,139,351.

The present invention relates to improvements in a waterproofing composition for masonry. More particularly, this invention relates to improvements in a composition for the sealing and stopping of pores, cracks, and holes in masonry and concrete walls, floors, and the like, for permanently preventing the passage of water. Further still, the present invention relates to unexpected improvements in providing superior waterproofing compositions for masonry that are decorative and provide pleasing aesthetic effects.

There are many waterproofing compositions on the market today, all of which intend to seal pores and the like, but it has been found in practice that they are not effective for stopping such pores, cracks and holes and exhibit, at best, only a temporary action. Moreover, many of these known compositions are undesirable because they will not bond to freshly poured concrete. Others will not bond to old concrete. A great many of the waterproofing compositions available today must be carefully mixed into a paste form and applied by a trowel, requiring a skilled craftsman to produce a result.

Many waterproofing compositions that are now available when employed in liquid or slurry form, must be agitated and kept in continual motion to prevent solid components from "settling out." Most objectionable, however, is that presently available waterproofing preparations cannot be applied to masonry areas affected with running water.

Still other commercially available materials require that the masonry area to be treated must be slightly dampened or moistened, severely limiting the speed of application and often requiring additional labor since only a small area of masonry can be maintained in a sufficiently dampened state, without drying, for any given period of time. Even these materials cannot be applied to pores and cracks having a condition of flowing or moving water. Other commercially available preparations require a great deal of physical effort to rub them into the pores that exist in all masonry products, and especially in cinder blocks. Almost all commercially available preparations require a drying period, and/or two or more applications, before they will effect even temporary water stoppage.

Many of the known commercially available waterproofing compositions, even when partly effective, have been found in practice to be undecorative and unattractive, whether applied to spotty or patching applications, and when applied as an overall paint-type application. For example, the basic color, usually an off-white or grey, almost always is non-uniform. This may be due to the settling out of components as above described, as well as the effects of moisture, and the "bleeding through," even after drying, of coloring materials from the substrata, particularly materials like iron oxide and other rust or tarnishes, and from dust, dirt and soot, etc.

Attempts have been made in the past to remedy these unsightly defects by the addition of pigments, but this remedy has been objectionable for several reasons. Almost always, the use of additives such as pigments or coloring agents in sufficient amounts to be effective for desired coloring and shading effects, provides an imbalance to the known compositions, decreasing their already limited effectiveness directly in proportion to the amount of pigment employed, and sometimes decreasing effectiveness very severely due to chemical imbalances. Since large amounts of pigments are usually required to achieve desirable colors and hues with known waterproofing agents due to defects mentioned above, the resultant limited waterproofing ability is very objectionable. Due also to the cost of the common pigments, their use in large amounts is economically undesirable in known waterproofing compositions.

Another simple solution to the discoloring problem suggests itself readily to the consumer. That is, to overcoat the known waterproofing coating with a desired paint color. This becomes objectionable very rapidly, however, because in almost all cases, the known waterproofing agents and compositions are not really amenable to overcoating by all or even some paints, whitewashes, etc. Quite often, the paint simply does not "take" or "wet" the waterproofing coating, causing difficulty in application, and always resulting in chipping, flaking and peeling. Paints that do "take" to some extent usually bubble up or blister after a short while because the known waterproofing agents provide only a temporary relief as noted above, and very frequently bleed moisture and water. When the overcoating paint chips or blisters, etc., it very frequently carries with it some of the undercoating, and the consumer is soon left with a very unsightly and leaky masonry structure. Further still, some waterproofing agents require exposure to the atmosphere, and overcoating or painting provides their direct ruination.

It is a principal object of this invention to provide an improved waterproofing composition that will overcome all of the above-mentioned disadvantages of prior art waterproofing preparations.

It is another object of this invention to provide an improved composition for the waterproofing coating of masonry containing a mixture of an alkaline earth oxide, a settable binding ingredient, an alkali metal halide and alkali metal carbonate.

Still another object of this invention is to provide an improved composition of matter which will stop relatively large cracks and holes in masonry and concrete walls, even though water may be flowing through these cracks and holes at the time of application.

A further object of this invention is to provide an improved inorganic waterproofing solution which can be easily and effectively applied to a wet or dry masonry structure.

It is a further principal object of this invention to provide for the prepartion of an improved inorganic, aqueous paint composition for the waterproofing of masonry wherein said inorganic composition comprises a blended powdered mixture containing about 54% lime, about 37% Portland cement, about 8% common rock salt and about 1% soda, plus or minus 10% for any component with respect to the remaining components.

It is still another object of this invention to provide an improved waterproof coating for masonry that may be supplied in desirable colors and hues and provide pleasing aesthetic and decorative effects, without deleteriously affecting the waterproofing value of the principal composition.

Other objects and advantages of this invention will become more apparent when reference is had to the following detailed description and accompanying examples.

In accordance with this invention, there is provided an improved composition for use as a waterproofing solution, paste, or putty for the substantially effortless brush, spray, or trowel application to dry or wet masonry materials, that is adaptable, when desired, to provide a decorative final product in one application.

To accomplish this result, the present invention envisions the preparation of a composition for the waterproof coating of masonry, comprising principally an improved mixture of lime, cement, salt and soda, that may have admixed therein various pigments and/or coloring agents.

Unexpectedly, it has been found that the waterproofing composition of this invention, consisting of the above-noted ingredients in admixture with water, will have the immediate effect of stopping water seeping through masonry surfaces, even when this composition is applied to masonry surfaces that are wetted by seeping water during the application of this composition.

In its preferred form, the improved composition of this invention comprises a dry mixture of the following construction:

| | Percentage parts by weight |
|---|---|
| Lime (calcium oxide, CaO) | 54 |
| Cement (Portland cement) | 37 |
| Salt (sodium chloride, NaCl) | 8 |
| Soda (sodium carbonate, $Na_2CO_3$) | 1 |
| | 100 |

The exact manner in which the several above components of this novel composition coact, when admixed with water, is not fully understood. However, the following explanation of how the several components are believed to act, is offered toward the end of aiding the understanding of this invention.

The Portland cement is believed to act as a base and carrier for the other ingredients and, of course, acts as a hardening and solidifying agent. The lime acts in a similar way and increases the rapidity of the hardening of the compound. In addition, it combines with water, causing the compound to swell in the pores and other openings of the masonry.

Sodium carbonate or soda also combines with a great quantity of water and may pick up ten or more molecules of water per molecule of sodium carbonate, holding the same in a firm and solid state. As it picks up water, the soda is believed to swell and fill many small pores that may occur in the masonry as well as in this sealing composition as it undergoes expansion and contraction due to the respective wetting and drying stages that may occur over the life of the composition. Moreover, the soda acts to make the composition of this invention more "workable" and more easily spreadable. The sodium chloride, preferably ground or powdered rock salt, acts as a hardener and curing agent and also dissolves and acts as a sealer. Once set, it will not again melt or dissolve.

It is believed that the novel coaction of the components of this invention constitutes a synergistic chemical action since the omission of any of the separate components will not give an acceptable and useful result.

It is preferred that each of the above materials be used in finely ground or finely powdered form, and normally, these materials, as commercially supplied, are in sufficiently fine form for use in the present invention. The coarse form of relatively crude materials may also be used, but powders are preferred to insure uniformity and homogeneity of composition, to facilitate initial powder blending, to facilitate final dissolution in water and the aqueous solutions subsequently described, and to insure overall uniform compositions of the product.

According to my copending application, Serial No. 220,037, I had determined that the above components could be subjected to some variation, with respect to one another, that is in the order of a plus or minus 2 to 6% for each above component, without deleteriously affecting the working properties of the invention. According to one embodiment of the present invention, I have now discovered the maximum and minimum permissible limit of variation for each of the above components. As already indicated in copending application Serial No. 220,037, the former limit of about plus or minus 6% is surprisingly critical, and I have now found that the newly discovered limits are very precise and highly critical. For best results it is preferred to work within the variation ranges disclosed above, and the variation limits I have now discovered are the absolute maximum and minimum limits that can be approached without deleteriously affecting the working effectiveness of my waterproofing composition in cases where it is economically desirable, or simply not possible to approach the preferred limits. It will soon become appreciated how deleterious effects are noted as these ranges are exceeded in either positive or negative fashion.

Thus, I have now discovered that while the amount of lime above is desirably kept within the range of about a plus or minus 6%, it may be varied to a maximum of about a plus 7 to 10%, or to a minimum of about a minus 7 to 10%. That is, the lime component may vary from 57.78 to about 59.4 parts and from about 50.22 to about 48.6 parts. If the amount of lime is increased more than 10%, I have found that my composition will be too wet and too slow to dry and thus give way to running water. If the amount of lime is varied below 10%, I have found that my composition will be too quick to dry, give off excessive heat, prevent proper setting and expand, rupture and crack and thus not give the permanence that my composition normally affords.

The amount of Portland cement is slightly more critical than the amount of lime and is desirably kept within the previously set amounts of plus or minus 6% but for some uses that do not require maximum strengths, the amount of cement may be varied as high as about plus 7 to 10% or about 39.59 to about 40.7 parts and may be varied as low as about minus 7 to 10% or about 34.41 to about 33.3 parts. Passing these limits on the positive side, however, will produce a material that will harden too quickly to provide proper setting and curing. If the lower limit is negatively exceeded, the resultant material will simply not be strong enough to bond to and/or within existing masonry structures.

The salt component is desirably only varied at most by a plus or minus 8%, but in some instances not requiring stringent physical properties, as with the cement above, the salt may be varied by as much as about a plus 7 to 10% or a minus 7 to 10%, that is, from about 8.56 to about 8.8 parts, and from about 7.44 to about 7.2 parts. If the amount of salt is exceeded by more than about plus 10%, the curing agent and hardener effects of the salt would take place too quickly and drying of the whole composition would occur too quickly, preventing proper curing and setting. If the amount of salt is reduced below about minus 10%, the composition will not set sufficiently well as a curing agent and hardener, or as a sealer in the ultimate composition.

The sodium carbonate component is desirably kept to the limits already found to be preferred, but in some instances may be varied by as much as about a plus 7 to 10% or minus 7 to 10%, that is, from about 1.07 to about 1.1 parts, and from about 0.93 to about 0.9 part by weight. If this limit is exceeded, the sodium carbonate would tend to pick up too much water and keep the present waterproofing composition in a state that is too soft to resist normally contemplated abrasion and shock, and too soft to resist the desired water test pressure that the present invention in its most preferred embodiment is intended to hold. If the lower limit is reduced, there will be insufficient sodium carbonate to "wet" the present composition and permit it sufficiently well to enter into masonry pores to give the most preferred holding action.

It is thus clear that the above dry components, in the preferred amounts given, define a surprisingly critical composition that may only be varied, when necessary, to the extent of about a plus or minus 10% for any component with respect to the remaining components. Quite clearly, this invention is not readily amenable to the inclusion of large amounts of diluents or fillers, due to the obvious deleterious softening and/or weakening effect that may take place. Thus, diluents that would become dissolved with and/or intimately admixed with the above components, should be limited to a maximum of about 10% by weight of the whole composition, and additives to such an extent should be relatively inert with respect to each of the lime, cement, salt and soda components. Materials that tend to affect such components should be used with more care, as a silicate, which may be added to serve as a diluent and filler but also acts to retard the speed of setting.

On the other hand, relatively inert and insoluble materials, such as fibrous thread, twine, sliver, roving, tow, etc., caulking compound base materials may be used in relatively any amount that permits the present composition to act chemically, since such large and coherent caulking bases serve only in a mechanical function. Similarly, large aggregate materials, such as while or crushed stone, may be employed in much the same manner as they are utilized in the preparation of concrete from cement. Any chemical action of such enlarged size materials is limited by their relatively small surface area when compared to an equivalent weight of a finely powdered material. As already indicated in copending application Serial No. 220,037, such large additives are useful in the repairing of large holes, cracks and fissures.

As in copending application Serial No. 220,037, other additives such as pigments and coloring materials may be added to my composition for decorative purposes. Known waterproofing compositions experience difficulty in this area, and are often subject to severely disadvantageous effects when attempts are made to admix them with pigments and coloring agents since the physical dilution may dilute the chemical effectiveness of known compositions and may chemically hinder or prevent reactions that must take place. The art thus lacks a successful means of coloring waterproofing compositions for masonry, particularly in an economic fashion.

As an added advantage of the present invention, coloring is surprisingly easy and effective since my composition advantageously dries to a bright and uniform white that not only physically, but even decoratively speaking, is greatly improved over the off-white, grey and mottled brown effects known in the art. Because of this desirable initial white color, the inventive composition does not require the large amounts and possible difficulty of using the common pigments, nor does it require the usual white extender pigments to overcome non-white colors, and the composition of the invention can be mixed in a great variety of colors, hues and shades using very economical amounts of commercially available coloring materials. Known pigments may be easily incorporated with the present composition by simple blending therewith in powder form, or by simple agitation when in liquid form. For the purposes of the present invention, amounts of pigment are usually not critical and may be employed as desired to provide desired colors to suit taste without deleterious effect. As an example, to make a peach color, one ounce of oxide red pigment and one ounce of ferrite yellow pigment may be added to fifty pounds of the dry composition of this invention. To make a light aqua, one ounce each of green pigment and umber brown pigment may be blended with fifty pounds of dry material.

To use the composition of this invention, the above dry mixture of lime, cement, salt and soda, with or without a desired amount of pigment, is mixed with sufficient water to give a flowable liquid, fluid, paint or putty consistency, as desired, which can be applied to any surface desired to be sealed by means of a brush, roller, spray gun, putty knife, trowel or other known device.

The composition will surprisingly set watertight immediately, and will hold back a considerable flow of water while setting due to the synergistic chemical coaction of the several components. The compound will tenaciously adhere to any surface, regardless of its smoothness, thereby forming an ideal sealing compound for damp basements, wet masonry walls, floors and the like. As will be described hereinafter in Example 3, the composition of this invention may be mixed with sufficient water to produce a paint, putty or plaster-like composition, and may be combined with various inert caulking-type fillers and crushed rock or similar type aggregates, if it is desired to fill and seal large holes, cracks and fissures and to provide smooth decorative surfaces, using suitable trowels and masonry tools, as indicated above.

Many types of water have been tested for use in this invention. It has been found that the composition of this invention will work equally well with waters having the following generally accepted designations: distilled water, drinking water, river, lake and pond water, limestone water, sulfur water, freestone (Tennessee soft water), brackish water, generally available "mineral" waters and the like. Extremely muddy or "riled" water is undesirable due to its high clay content. Chemical waste liquors are generally objectionable due to the content of chemicals which may react or combine with the composition components of this invention.

When the components are provided in substantially commercially pure form and the water employed is generally clear, the composition of this invention, with or without pigment, will provide a cloudy white (or pigment colored) solution when mixed with water and especially when mixed in equal proportions by volume with water. Although some settling is evidenced after standing from 4 to 6 hours, the solution may be readily and easily stirred to re-obtain the proper suspension. It is this water solution stability, even with a coloring agent or pigment, that is also a surprising feature of the present composition when compared with commercially available prior art materials.

Generally speaking, in the preparation of the aqueous mixture of this invention, the proportion of dry solids to water can be varied depending on the individual need and the result desired for the particular situation. However, and as a rule, it is convenient to use 1 part of dry solids to 1 part of water, on a volume basis, although other mixing proportions will also be found satisfactory.

The invention will now be more fully understood when reference is had to the following examples.

*Example 1*

Twenty-seven pounds of commercially available lime (CaO), 18½ pounds of commercial cement, 4 pounds of common commercial grade rock salt (NaCl) and ½ pound of commercial soda ($Na_2CO_3$), all obtained in a dry and powdered form, were introduced into the hopper of a commercial mixer, blended in the dry state and emptied into a suitable container. To this mixture was added sufficient water, about 6 gallons, to obtain a flowable liquid mixture.

The mixture of this invention and like mixtures of several commercially available waterproofing materials for masonry, mixed according to the directions given on the respective packages, were placed in suitable containers and taken to a building having a damp basement floor, often exhibiting seeping or moving water. All mixtures were carefully brushed onto equally damp areas of the floor and permitted to dry. In a short time, water seeped under the commercial products and caused them to blister and to break. The composition of this invention held firmly to the floor, exhibiting a good bond, and prevented water seepage.

Example 2

Into the hopper of a commercial "dry" blender were poured 13½ pounds of finely powdered lime, nine and one-quarter pounds of finely powdered Portland cement, 2 pounds of finely powdered rock salt and ¼ pound of finely powdered soda. The hopper was closed and the blender was run for about 10 minutes. After the blender was shut off, the contents of the blender were emptied into a large paper sack to yield 25 pounds, dry weight, of the waterproofing composition of this invention.

A one gallon liquid measure was obtained and filled with a portion, about 8 pounds, of the above blended composition. This "gallon" of powdered composition was emptied into a suitable larger vessel containing 1 gallon of ordinary "tap" or "faucet" water, followed by stirring for a few minutes to yield a cloudy-white, flowable, liquid paint.

For comparison purposes, several commercially available powdered waterproofing "cements" or compositions were also prepared at the same time according to their commercially available directions, by skilled craftsmen. These commercial mixtures and the paint mixture of this invention were prepared in a building having a basement from which a great quantity of water had just been drained, and into which water was continually seeping due to rainy weather outside. The basement was constructed of commonly available concrete blocks with concrete mortar seams and the floor was concrete. The several mixtures and the paint mixture of this invention were then applied to equally damp floor and wall areas by craftsmen who employed brushes as directed for each mixture. In painting wall areas, it was noted that the commercial mixtures tended to wet the brushes, brush handles and craftsmen themselves and great care and effort was required to brush and rub these mixtures into the damp cracks, openings and fissures in the concrete block walls. Surprisingly, it was discovered that the paint mixture of this invention did not run down the brush onto the brush handle and the worker, but showed an improved wetting action and a great affinity and cohesion for the concrete wall surface being painted. moreover, very little effort was required to apply the paint of this invention since it tended readily to flow into the damp pores, openings, etc., of the concrete and form a seal therein. The same ease of application has also been noted on other concrete walls, whether new and wet or dry, or old and wet or dry, with the paint mixture of this invention.

After all the mixtures had been applied, second coats of each, including the paint of this invention, were applied as directed due to the extreme dampness existing in this location. Following this second application, all materials were examined as they dried. In all instances, the commercial mixtures did not "hold water" or form a firm seal. They dissolved, "leaked," peeled or dried, followed by blistering and cracking. Surprisingly, the paint of this invention formed a firm bond on all surfaces, dried, and maintained a firm bond and a moisture seal without "leaking", dissolving, peeling, blistering or cracking. The remaining areas of the basement were then perfunctorily cleaned of their commercial treatments and painted with the mixture of this invention. The entire basement has remained dry through repeated rainstorms and drying spells since this treatment.

Example 3

To demonstrate the adaptability of the composition of this invention, a quantity of this composition, blended as in Examples 1 and 2 and containing about 54% calcium oxide, about 37% Portland cement, about 8% sodium chloride and about 1% sodium carbonate was mixed with sufficient water to form a smooth white liquid putty or plaster for the purpose of stoppering a large hole, about ¾ inch in diameter in a basement masonry wall constructed from cinder blocks. Rain water was flowing through this hole and into the basement at a rate of about 1 gallon per minute.

A wadding or caulking material, consisting essentially of cotton string or yarn and containing no chemicals that are reactive with the composition components of the present invention was saturated with the liquid putty mixture prepared above and fitted into the hole with sufficient pressure to just stop the water from flowing with force. The putty mixture was observed to form an immediate seal and stopped all water flow almost immediately.

Similar putty or plaster, prepared from the composition of this invention to a "plastic" or "trowelable" consistency, was then troweled over the caulked or stoppered hole to provide a decorative and smooth finish. This "hole" has not since leaked through repeated rainstorms and drying spells.

The present invention offers improvements in many areas of masonry uses, particularly when treating new, "fresh" or "green" blocks. The new or "green" blocks are normally impossible to treat directly with known waterproofing agents, possibly due to insufficient setting as the lime to calcium carbonate reaction that may still be taking place in concrete products for up to a year after their formation. In any event, it is commonly required that to waterproof new or "green" concrete products with known waterproofing agents, it is necessary to first wash the blocks with acid (usually the commercial or "muriatic" form of hydrochloric acid), often desirably followed by use of a detergent and thorough rinsing. Surprisingly, these procedures are not required for the present invention and the present composition, with or without pigment or coloring agent, may be applied directly to new or "green" concrete products.

Moreover, most of the prior art waterproofing materials could only be applied to masonry products that were kept in a damp (but not flowing water) state. The present composition may be applied to completely dry surfaces, apparently due to the presence of soda. Besides its utility on dry masonry products, the present composition may be directly applied to damp, wet or flowing water covered concrete products and exhibit excellent and immediate waterproofing qualities.

While a few admixtures of the improved compound of this invention have been described above, together with theories which are believed to account for its unusually efficient action, it is to be understood that the invention is not limited to these exact compounding formulae or the exact procedures described, except insofar as such limitations are contained within the appended claims, nor is it intended that this invention is to be dependent upon the accuracy of the theories which have been advanced herein.

Having thus described the invention, what is claimed and desired to be secured by Letter Patent is:

1. A composition for the waterproof coating of masonry consisting essentially of 37 parts by weight of Portland cement, 8 parts by weight of sodium chloride, 1 part by weight of sodium carbonate, and 57.78 to 59.4 parts by weight of calcium oxide.

2. A composition for the waterproof coating of masonry consisting essentially of 37 parts by weight of Portland cement, 8 parts by weight of sodium chloride, 1 part by weight of sodium carbonate, and 50.22 to 48.6 parts by weight of calcium oxide.

3. A composition for the waterproof coating of masonry consisting essentially of a mixture of 54 parts by weight of calcium oxide, 8 parts by weight of sodium chloride, 1 part by weight of sodium carbonate and 39.59 to 40.7 parts by weight of Portland cement.

4. A composition for the waterproof coating of masonry consisting essentially of a mixture of 54 parts by weight of calcium oxide, 8 parts by weight of sodium chloride, 1 part by weight of sodium carbonate, and 34.41 to 33.3 parts by weight of Portland cement.

5. A composition for the waterproof coating of masonry consisting essentially of a mixture of 54 parts by weight of calcium oxide, 37 parts by weight of Portland cement, 1 part by weight of sodium carbonate and 8.56 to 8.8 parts by weight of sodium chloride.

6. A composition for the waterproof coating of masonry consisting essentially of a mixture of 54 parts by weight of calcium oxide, 37 parts by weight of Portland cement, 1 part by weight of sodium carbonate and 7.44 to 7.2 parts by weight of sodium chloride.

7. A composition for the waterproof coating of masonry consisting essentially of a mixture of 54 parts by weight of calcium oxide, 37 parts by weight of Portland cement, 8 parts by weight of sodium chloride, and 1.07 to 1.1 parts by weight of sodium carbonate.

8. A composition for the waterproof coating of masonry consisting essentially of a mixture of 54 parts by weight of calcium oxide, 37 parts by weight of Portland cement, 8 parts by weight of sodium chloride, and 0.93 to 0.9 part by weight of sodium carbonate.

No references cited.

TOBIAS E. LEVOW, *Primary Examiner.*